(No Model.)
J. KNOUS.
CRANK FOR VELOCIPEDES.
No. 363,522. Patented May 24, 1887.
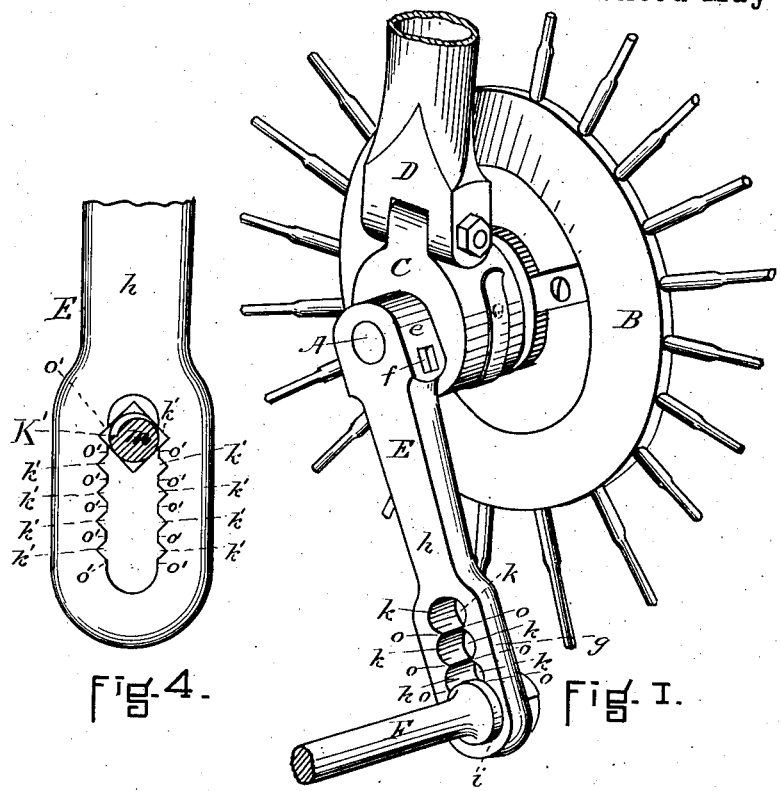
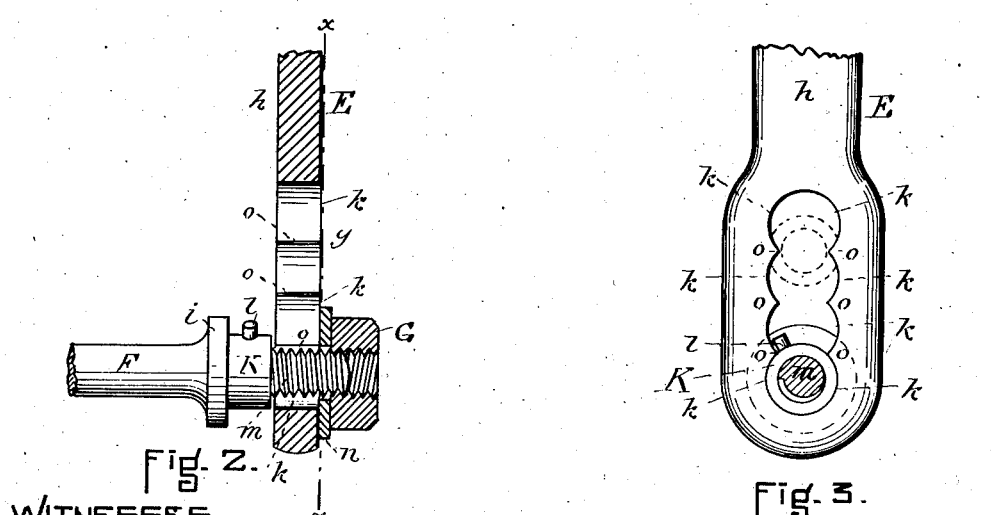
WITNESSES
INVENTOR

UNITED STATES PATENT OFFICE.

JOHN KNOUS, OF HARTFORD, CONNECTICUT, ASSIGNOR, BY MESNE ASSIGNMENTS, TO THE POPE MANUFACTURING COMPANY, OF PORTLAND, MAINE.

CRANK FOR VELOCIPEDES.

SPECIFICATION forming part of Letters Patent No. 363,522, dated May 24, 1887.

Application filed March 10, 1886. Serial No. 194,682. (No model.)

*To all whom it may concern:*

Be it known that I, JOHN KNOUS, of the city and county of Hartford, in the State of Connecticut, have invented certain new and useful Improvements in Cranks for Velocipedes and other Purposes, of which the following is a specification.

My improvements relate more particularly to that kind or class of cranks known as "adjustable cranks," which have heretofore been constructed with a boss, a web, and a wrist-part, in which wrist part there have been either two or more holes completely separated and some distance apart, into either of which the wrist-pin or pedal-pin might be inserted and secured, or else an elongated parallel-sided slot in which the wrist-pin or pedal-pin could be moved to different positions nearer to or farther from the crank-boss. In either of these constructions the object has been to obtain a means of adjusting the length of the crank, so as to obtain longer or shorter throw. In the first construction indicated, where this variation of throw was obtained by separate holes for the insertion and securement of the wrist-pin or pedal-pin, the object has been attained only in a partial way, since the holes have been necessarily at a considerable distance apart, and in light cranks, especially for bicycles and other velocipedes, there could be with difficulty more than two variations of the pedal-pin attained; and this partial attainment of the object has also been at the expense of annoyance and trouble in changing the pedal-pin from one position to another by reason of the necessity of removing the nut and the washer entirely from the pedal-pin, drawing the latter from its seat, replacing it in another position, and then putting on the washer and nut again and setting up, and this annoyance and trouble is very material in the use of velocipedes upon roads where there is liability of dropping the parts into dust or gravel and losing them. On the other hand, with the elongated slot, while the changes of position of the pedal-pin gained could be more in number and nearer together, and the annoyance and trouble of entirely removing the parts was obviated, other difficulties were found, in that the pedal-pin must be very sharply and strongly set up by the nut on the opposite side of the crank-wrist, requiring a larger wrench than is usually at hand for velocipede-riders, and then in the use of the machine and constant jarring the pedal-pin is constantly subject to being loosened, and as soon as a trifle loosened moves in the elongated slot and gets out of place.

The object of my improvements is to attain the advantages of both these previous forms, while avoiding the difficulties and objections of both, and at the same time to obtain a stronger and more positive and more secure attachment of the pedal-pin to the crank-wrist, and the nature of them will be apparent from the following description, taken in connection with the drawings, in which the same reference-letters indicate the same parts in the different figures.

Figure 1 shows a view of the flange of a bicycle-wheel with a part of the front fork, bearing, and axle, and a crank and part of the pedal-pin in position, showing my improvements in one form. Fig. 2 shows in section a crank-wrist and pedal-pin and nut embodying my improvements in the form shown in Fig. 1; and Fig. 3 shows in elevation, on the line $x$ $x$ of Fig. 2, the same parts, the nut and washer being removed. Fig. 4 shows a similar device with my improvements in a modified form.

A is a bicycle-axle.

B is a hub flange.

C is a bearing-box, in which the axle revolves.

D is a part of the front fork or portion of the frame connected with the bearing-box.

E is a crank having the boss $e$, through which the axle A passes, and the crank is secured to this axle by means of the key $f$. The crank E has also a web, $h$, and the wrist end $g$.

F is a pedal-pin (the pedal not being shown, but which may be passed on the pin at the left of the shoulder $i$ on the part which is broken off) having a shoulder, $i$, a tenon, $k$, a pin or stop, $l$, and a threaded end, $m$.

G is a nut internally threaded and screwing upon the threaded end $m$ of the pedal-pin, and $n$ is a washer placed between the nut and the crank-wrist.

The tenon K may be made cylindrical in section, as shown in Figs. 1, 2, and 3, and about as long as the thickness of the crank-wrist, and the crank-wrist is constructed with a series of depressions or seats, k k, on either side, between which depressions or seats are ribs o o, and where the tenon is thus made in cylindrical form the depressions k between the ribs o o are also made cylindrical with curved sides, showing in cross-section circles having the same radius as the tenon. It will be seen that by this construction the center or axis of the seat for the pedal-pin and its tenon is in any one of two adjacent positions less than a diameter of the tenon distant from the other of the two positions; also, that the distance between any two opposite ribs o o is equal to or greater than the diameter of the threaded end m of the pedal-pin, and that these different openings for seats of the pedal-pin are confluent or connected, so that by partially removing the nut G, as shown in Fig. 2, the pedal-pin and its pedal may be moved so as to withdraw the tenon from its seat and then moved so as to bring it in line with either of the other seats and then moved into its new seat and then secured by the nut without entirely removing any of the parts from each other.

The object of the small pin or stop l is to prevent the pedal-pin from revolution on its axis when the nut G is turned either to secure or to release a pin. Instead, however, of making the tenon K and the depressions k cylindrical in form, the pin may be made in any other form—as, for instance, square, as shown in Fig. 4. The depressions k' k' may then be angular notches between the projections o' o', and serve to form seats for the tenon and also stops to prevent the pedal-pin from turning when the nut is screwed on or off. With this modified construction the ribs and depressions may be made nearer to each other, and more positions for the pedal-pin may be obtained in the same distance in the crank-wrist, and thus have an advantage in this way. On the other hand, the seat is, I think, not so secure and the strength of the structure is not so great as in the form shown in Figs. 1, 2, and 3.

I have described my improvements as shown and applied in a bicycle-crank and at the wrist end of the crank. It is obvious, however, that they have equal application in cranks for tricycles or other velocipedes and for cranks in other machines where ready adjustability of throw is required, together with firmness and security of structure; also, that the adjustment with obvious slight modifications could be made at the boss end of the crank instead of the wrist end; also, that other modifications of form and arrangement might be made without departing from the substance of my invention. I do not, therefore, mean to limit myself to the precise forms, proportions, and arrangements shown and described.

I am aware that in attempting to overcome the difficulties which I have pointed out as attending the use of an elongated parallel-sided slot in the crank, nicks or small notches have been made in the corners of the edges of the slot for little projections from the shoulder of the crank-pin, and in some instances a similar attempt has been made by making the back side of the crank-wrist ribbed, with corresponding ribs in the washer held by the nut which secures the crank-pin in the crank-wrist. A similar attempt appears to be shown in the drawings of an English patent by a partial countersink on one face of the crank-wrist in a curved line as if for three positions of the shoulder of the crank-pin; but this is in connection with a parallel-sided slot and equivalent to the before-mentioned ribs or notches. By each of these methods some degree of correction was attained—namely, less immediate sliding of the crank-pin in the slot upon the loosening of the nut; but in neither of these forms were either the construction or the means used which I have described and shown, nor was there secured any positive seat for the crank-pin. I do not broadly claim notches or ribs on a crank-wrist; but

I claim as new and of my invention—

1. A crank constructed with two or more mortise-seats in its wrist for the tenon of a wrist-pin, the distance between centers of either two adjacent mortise-seats being less than the diameter of a mortise-seat, and with each seat extending through the middle portion of the crank-wrist and having one or more curved or inclined sides to bear upon correspondingly curved or inclined sides of a tenon and one or more open sides between ribs, essentially as set forth.

2. The combination of a tenon, as K, having curved or inclined sides, and a shoulder, as i, and a threaded extension, as m, with a crank having two or more mortises or seats for the tenon, each seat having one or more open sides between ribs, as o o, and one or more curved or inclined sides, as k, to bear on curved or inclined sides of the tenon, and a nut, as G, essentially as set forth.

JNO. KNOUS.

Witnesses:
DAVID J. POST,
A. J. WELLES.